R. W. ERDLE.
DEVICE FOR MEASURING AND FEEDING LUMINOUS MATERIALS.
APPLICATION FILED APR. 11, 1919.
1,418,292.
Patented June 6, 1922.
2 SHEETS—SHEET 1.
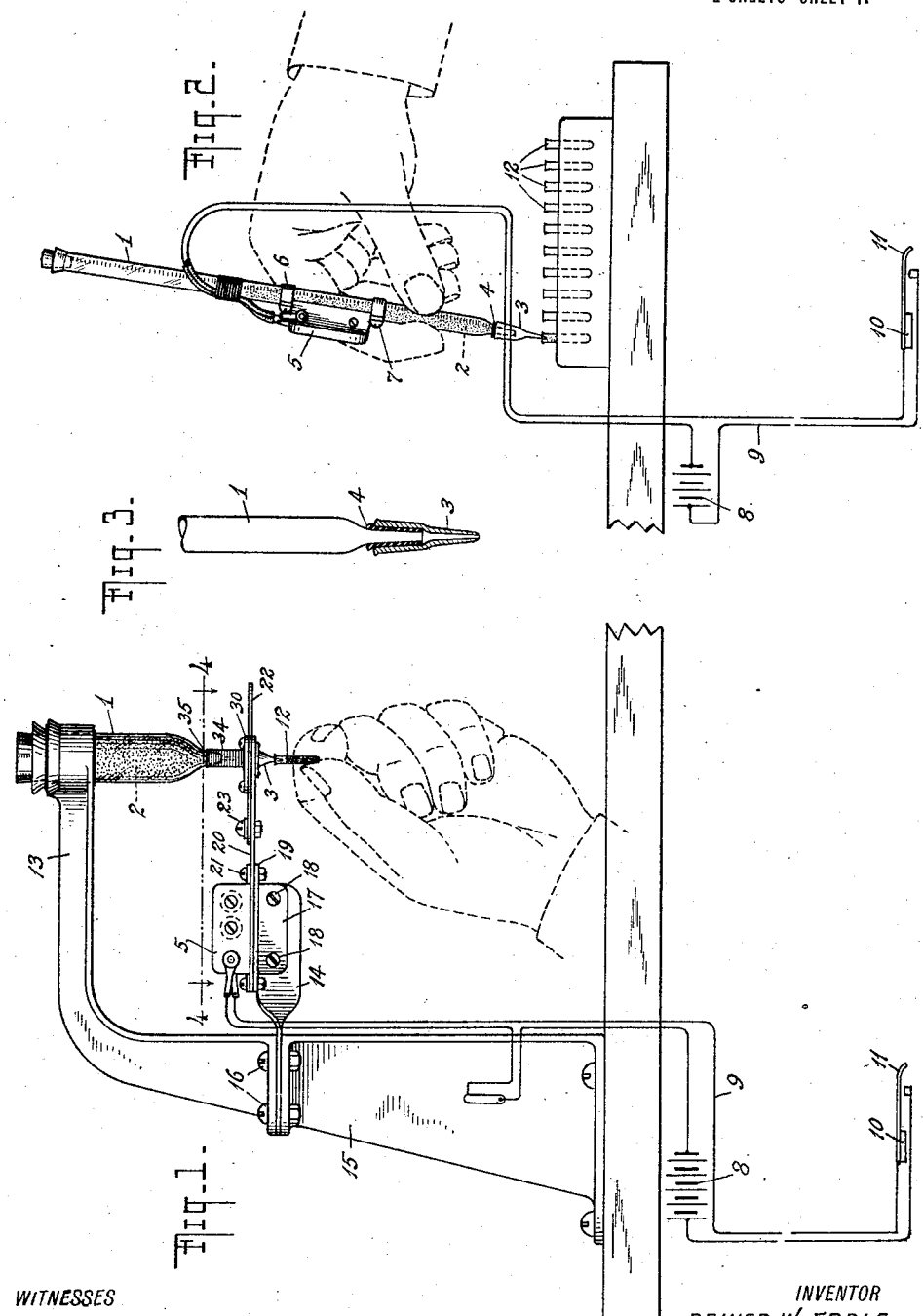
WITNESSES
INVENTOR
REINER W. ERDLE
BY
ATTORNEYS R. W. ERDLE.
DEVICE FOR MEASURING AND FEEDING LUMINOUS MATERIALS.
APPLICATION FILED APR. 11, 1919.
1,418,292.
Patented June 6, 1922.
2 SHEETS—SHEET 2.
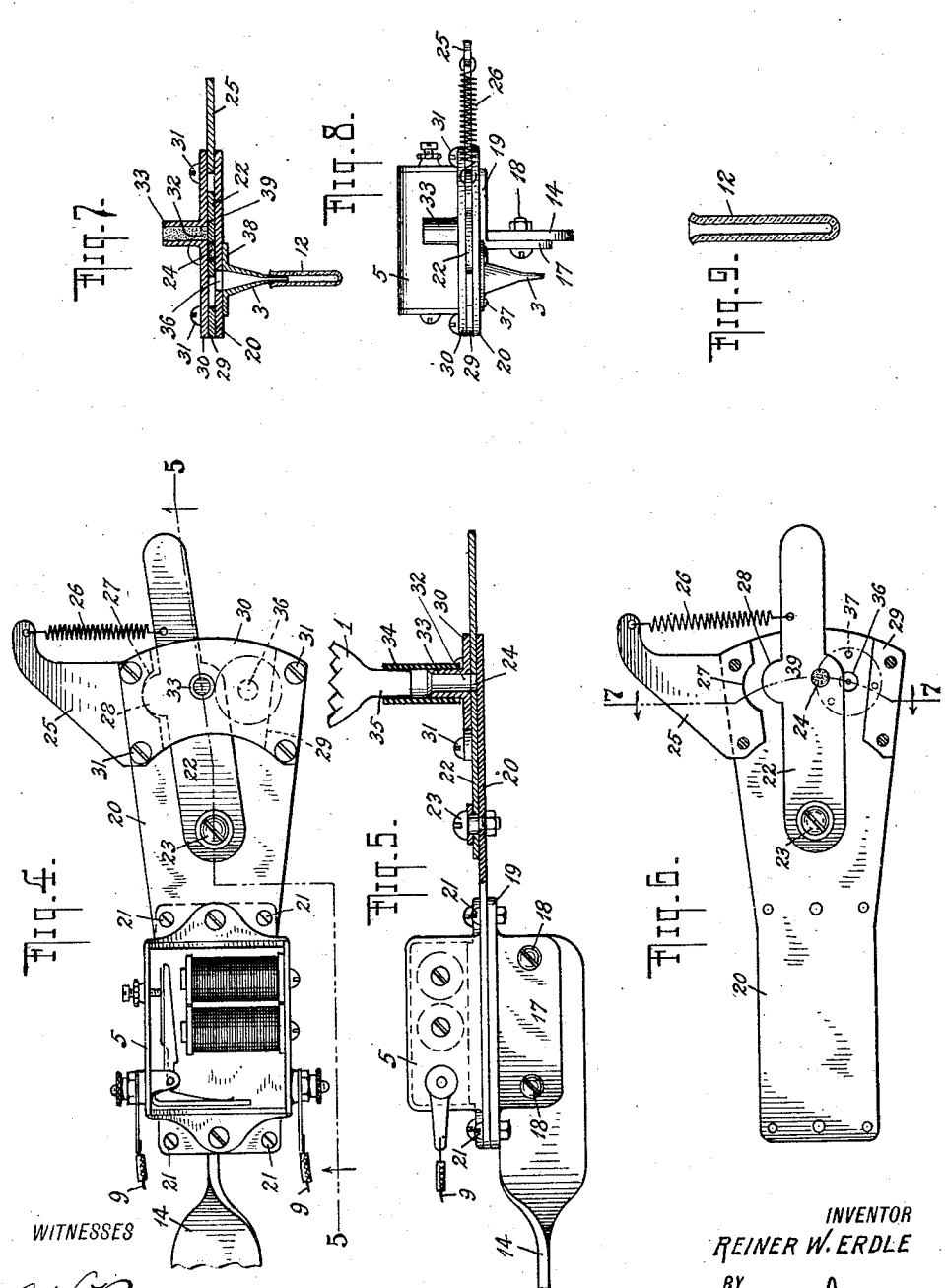
WITNESSES
INVENTOR
REINER W. ERDLE
BY
ATTORNEYS

UNITED STATES PATENT OFFICE.

REINER W. ERDLE, OF NEW YORK, N. Y., ASSIGNOR TO THE COLD LIGHT MANUFACTURING COMPANY, A CORPORATION OF COLORADO.

DEVICE FOR MEASURING AND FEEDING LUMINOUS MATERIALS.

1,418,292.      Specification of Letters Patent.      Patented June 6, 1922.

Application filed April 11, 1919. Serial No. 289,454.

*To all whom it may concern:*

Be it known that I, REINER W. ERDLE, a citizen of Germany, residing in the borough of Manhattan, city and State of New York, have invented certain new and useful Improvements in Devices for Measuring and Feeding Luminous Materials, of which the following is a specification.

In the drawing, Fig. 1 is a front elevation of the device for measuring and feeding the material. Fig. 2, a modification of the feeding device; Fig. 3 an elevation partly in cross section of the hopper and spout of Fig. 2; Fig. 4 a top plan view through the line 4—4 of Fig. 1; Fig. 5 a section taken on the line 5—5 of Fig. 4; Fig 6 a plan view, the same as Fig. 4 with the vibrator and bridge piece 30 removed; Fig. 7 a cross sectional view taken on the line 7—7 of Fig. 6; Fig. 8 an end elevation of the apparatus shown in Fig. 4. Fig. 9 a container to be filled.

This invention relates to mechanisms and appliances for measuring luminous materials and for filling containers or capsules therewith. The luminous materials in general use today consist of a mixture of a radio-active material such as radium and a proper radio-responsive material such as zinc sulfid. These luminous materials are exceedingly expensive and in order to properly handle the material in preparing luminous appliances, great care and economy must be exercised. The present invention has for its purpose mechanisms for storing, measuring and feeding the material so that the amounts thereof may be measured and fed into a carrier or capsule with exactness and speed.

The hopper 1 consists of a suitable tube (glass being preferred) containing a luminous material 2. The hopper terminates in a contracted spout 3 which is preferably made of metal and is secured to the hopper by a rubber gasket 4. The luminous material 2 normally chokes in the spout 3 and is thereby retained from flowing out of the hopper. In this condition the hopper may be moved about without the loss or escape of the material.

A device for agitating the material in the hopper is secured in proximity to the hopper for the purpose of agitating the material therein thereby setting up movement of the particles of the material causing them to escape out of the spout 3 into such containers 12 as it is desirable to fill with the material. These containers are held one at a time under the spout 3. An ordinary buzzer 5 has been found to be suitable to cause such agitation. The buzzer is connected to the hopper by suitable means such as the collars 6 and the threaded screws 7. The buzzer is connected with batteries 8 by the wiring 9 and a "make and break" connection 10 is placed in the circuit. Contact is made through the foot pedal 11.

The hopper may be used as a pencil as shown in Fig. 2 or else may be suspended from a suitable bracket 13 as shown in Fig. 1 in connection with a measuring receptacle hereinafter explained.

The operation of the device is as follows:

The operator takes a container such as 12 and brings it in registry with the spout 3. The circuit is closed by pressure on the pedal 11, which causes the vibrator 5 to be actuated, thereby setting up agitation of the luminous material 2 in the hopper 1 and causing the particles of the material to feed through the spout 3 into the container 12 held thereunder.

When the required amount of material has been fed into the container 12, the operator removes the pressure from the pedal 11 thereby breaking the circuit and stopping the vibration. The material will instantly clog or choke in the spout 3 and stop the feed thereof.

This permits of an accurate measurement of the powder and exact control of the feed thereof. In this art such measurement and control of the feed is highly desirable because of the cost and value of the luminous material.

The feeding and vibrating device is shown in Fig. 1 in connection with measuring mechanism for separating a predetermined amount of luminous material. The hopper 1 is hung in a bracket 13. An arm 14 is secured to the standard 15 by the bolts 16. At the end of the arm 14 a web 17 is secured by the bolts 18. This web has a flange 19 thereof on which a plate 20 rests. The buzzer or vibrator 5 is placed on the plate 20 and the three parts 17, 19 and 20 are secured together by the bolts 21.

A slide 22 is pivoted at 23 on the plate 20. This slide 22 has a receptacle 24 therein. The receptacle has a predetermined capacity (say about 6 milligrams). The receptacle 24 is movable backwardly and forwardly over the plate 20 under a pull of the hand on the end of the slide 22. At one side of the plate 20 an arm 25 is secured to which one end of a coil spring 26 is fastened, the other end being secured to the slide 22. The spring 26 tends to normally draw the slide toward it. The arm 25 has a recess 27 therein and the slide 22 has a lug 28 thereon. The lug 28 engages in the recess 27 thus fixing the position of the receptacle 24 in alignment with the funnel 35 of the hopper 1. On the plate 20 opposite said arm 25 a plate 29 is secured and lies at the end of the path of the slide 22 and limits its forward movement. Bridging the space between the recessed end of the arm 25 and the plate 29 is a spanning piece 30 secured to said arm 25 and plate 29 by the screws 31. This spanning piece has a close fit over the slide 22 and further has an aperture 32 therein which aperture 32, when the slide is in normal position (when the spring has drawn the slide backward to the full extent) is in registry with the receptacle 24. A short tube 33 of metal is secured on the piece 30 and around the aperture 32. A flexible connecting tube 34 has one end over the tube 33 and the other end over the funnel 35 of the hopper 1.

The plate 20 has a hole 36 therein and in the path of the receptacle 24. When the receptacle is moved forward to its furthermost limit (when it abuts against the plate 29) the receptacle 24 registers with the hole 36. Beneath the hole 36 a spout 3 is secured by screws 37 through the flange 38.

The operation of the last mentioned device is as follows:

The slide 22 lies against the arm 25 placing the receptacle 24 in registry under the funnel 35 of the hopper 1. The operator holds a container under the spout 3 and closes the circuit by pressure on the pedal 11. Closing the circuit causes the vibrator 5 to be actuated, which vibrates substantially all of the parts carried by the arm 14, and also causes the material 2 in the hopper 1 to be agitated. The agitation of the material 2 causes the particles thereof to flow through the tube 34 and aperture 32 into the receptacle 24 thus filling it. The slide 22 is moved by hand forward against the pull of the spring 26. The surplus material is held in the tubes 33 and 34 by the surface 39 of the silde 22. The fit of the slide 22 against the plate 30 being tight so that the material 2 cannot pass beneath it. The continued movement of the slide 22 to its limit causes the receptacle 24 to register with the hole 36 (in the plate 20) whereupon the load of the receptacle 24 is dropped through the spout 3 into the container 12 held thereunder.

The slide 22 is released and returns, under the pull of the spring 26, to its normal position bringing the receptacle 24 back under the hopper 1 for another charge. The operation of the slide may then be repeated with a new container 12.

What I claim is:

1. In a device for filling containers with luminous material, in combination, a hopper adapted to hold a luminous material, a feeding mouth receiving a supply of material from said hopper, the material normally clogging in said mouth whereby the feed from said hopper is interrupted, means, under the control of an operator, upon the actuation whereof the material is agitated and caused to flow from said mouth into a container, and upon the stoppage of said actuating means the material instantly clogging in said mouth.

2. In a device for feeding powder, in combination, a hopper adapted to receive a powder, the powder being retained in the hopper by the walls thereof, a feeding mouth adapted to receive powder from said hopper and a vibrator connected with the feeding mouth, means for controlling the vibrator, said vibrator upon actuation thereof causing the powder to flow from said mouth and upon the break in the actuating means causing an immediate cessation of the flow of the material.

3. In a device for feeding luminous materials in combination, a hopper adapted to hold a luminous material, a feeding mouth receiving powder from the hopper the material being normally retained in the hopper by contact therewith, a vibrator connected with said hopper, means for controlling the actuation of the vibrator, connection between the controlling means and the vibrator permitting movement of the hopper, the hopper being free to move, the vibrator upon actuation thereof by movement of the controlling means causing agitation of the powder therein and movement thereof through the feeding mouth and upon stoppage of the vibrator choking the material in the hopper.

4. In a device for feeding luminous powders in combination, a hopper having a pencil-like formation, a feeding mouth at the lower end thereof, the said hopper and mouth being adapted to hold a material, the material normally clogging in said hopper, means in proximity to said hopper upon the actuation whereof vibration is communicated to said material causing an agitation thereof and the material, upon the stoppage of the said actuating means, instantly clogging in said hopper.

5. In a device for feeding luminous powders in combination, a hopper having a pencil-like formation, a feeding mouth at the lower end thereof, the said hopper and mouth being adapted to hold a material, the material normally clogging in said hopper, means in proximity to said hopper upon the actuation whereof vibration is communicated to said material causing an agitation thereof and the material, upon the stoppage of the said actuating means, instantly clogging in said hopper, said actuating means comprising an electric vibrator having a flexible connection to a source of power whereby the device may be freely manipulated.

In witness whereof I have hereunto set my hand.

REINER W. ERDLE.